Aug. 17, 1965   R. D. BLUE ETAL   3,201,229
CESIUM PRODUCTION
Filed Dec. 20, 1961
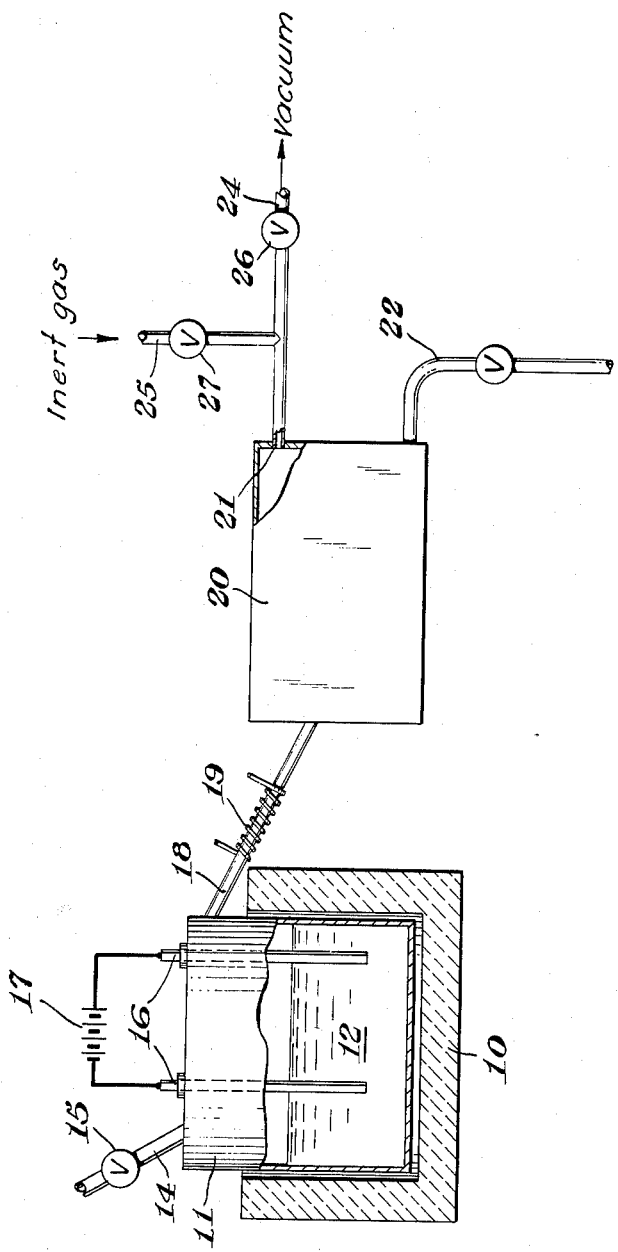
INVENTORS.
Robert J. Moolenaar
Robert D. Blue
BY
ATTORNEY United States Patent Office
3,201,229
Patented Aug. 17, 1965

3,201,229
CESIUM PRODUCTION
Robert D. Blue and Robert J. Moolenaar, Midland, Mich., assignors to The Dow Chemical Company, Midland, Mich., a corporation of Delaware
Filed Dec. 20, 1961, Ser. No. 160,842
12 Claims. (Cl. 75—66)

This invention relates to the production of cesium by the reduction of a cesium halide with an alkali metal, and is more particularly concerned with such production where said alkali metal is produced from an alkali halide in situ.

Cesium is a highly active metal. It reacts spontaneously with water, generating sufficient heat to ignite the free hydrogen produced. Further, cesium has strong ionization tendencies so that it is not easily reduced to or retained in its metallic state. Therefore, methods of producing metallic cesium must take these properties into account.

Cesium has been produced by mixing a finely ground cesium salt, such as CsOH or $Cs_2CO_3$, with magnesium or aluminum. The mixture is heated to red heat in a stream of dried hydrogen and cesium is collected as a vapor and condensed. The yield from this method is fair, but the procedure is slow and expensive.

Another method for cesium production involves reduction of cesium salts by misch metal at high temperature under reduced pressure. Cesium is distilled from the reduction mixture as it is produced, and is condensed and collected. This method has the advantage of producing a relatively high purity cesium, but the disadvantages of being cumbersome and expensive.

The method of the present invention involves reducing an alkali metal halide electrolytically to produce the alkali metal, which in turn reacts with the cesium halide to produce metallic cesium.

Some of the advantages of this invention are the lower process raw material cost and lower operating temperatures. Metallic cesium having a relatively high degree of purity is thus produced by an efficient and inexpensive method.

The invention, in a specific form, may be readily understood by reference to the accompanying schematic drawing and the following example which are given for the purpose of illustration but are not to be construed as limiting.

In the schematic drawing, a cut-away illustration of apparatus is depicted. A furnace 10 is provided and an appropriate container 11 positioned in the furnace. A bath 12 of a molten mixture of cesium halide and alkali metal halide is placed within the container 11. Said container is provided with an outlet 14 for halogen produced during the process, said outlet being provided with a stop valve 15. Electrodes 16 are positioned within said molten bath 12 and supported by container 11. Optionally, with appropriate materials of construction and proper insulation, container 11 may be used as an electrode, usually as a cathode. Said electrodes 16 are electrically connected to a direct current source 17.

The container 11 is additionally provided with another outlet 18 which acts as a side arm condenser. Said condenser 18 may be cooled, if desired, as by a water coil 19. Said condenser 18 empties into a receiving vessel 20. Said receiving vessel 20 is provided, additionally, with a gas outlet 21 and a suitably controlled outlet 22 for cesium metal.

Said gas outlet 21 is connected, by means of a T arrangement to a vacuum line 24 and a source of inert gas 25. The vacuum line 24 and the inert gas source line 25 are valved with valves 26 and 27 in such a manner that when either line is open to the receiving vessel, the other line is closed. It is to be understood that the system be constructed in such a manner as to be evacuable.

Utilizing the apparatus above described, a mixture of 70 mole percent lithium chloride (LiCl), 30 mole percent cesium chloride (CsCl) is positioned within the container 11 as bath 12. With valves 26 and 27 closed and valve 15 on outlet 14 open, the bath mixture is heated by furnace 10 until substantially all water and other volatile impurities have been driven from the mixture 12. Optionally, the system may be flushed with inert gas as by closing valve 15, opening valve 26 and reducing the pressure in the system. Valve 26 is then closed and valve 27 opened to fill the system with an inert gas such as argon. This flushing step may be repeated as often as desired, or omitted altogether. It is desirable to remove as much water from the system as possible since water will react with metallic lithium or cesium produced and thus reduce cathode efficiency.

Once the water has been removed from the system, and the bath mixture 12 is molten, electrolysis is begun with valves 26 and 27 closed, valve 15 open, and cesium removal line 22 closed. The bath 12 is electrolyzed at 500 degrees centigrade. Electrodes 16, positioned within the bath 12, are electrically connected to a direct current source 17. When chlorides are used, the anode is usually of graphite. An E.M.F. of from about 3.5 to about 10 volts is required to operate the process, depending on electrode positioning and optimum current density. Optimum current density is defined as the maximum current density which may be used without seriously reducing electrode efficiency, as by polarization, product removal time lag, mechanical mixing of the bath by gas evolution, electrode material limitations, and the like. Usually, electrolysis is begun at a low voltage in order to drive any residual water and other impurities from the system, the voltage being gradually increased until optimum current density is attained.

As electrolysis is continued, chlorine is produced at the graphite anode and removed at outlet 14. Metallic lithium and some metallic cesium are produced at the same time at the cathode. Electrolysis is continued, preferably at a temperature about 460 degrees centigrade, until the overall bath salt composition is about 35 mole percent lithium chloride (LiCl) and 65 mole percent cesium chloride (CsCl), said bath also containing substantial quantities of metallic lithium. Electrolysis may be carried out longer if desired, but the above-stated composition is preferable.

After electrolysis is completed, outlet 14 is closed off by means of valve 15 and the system may be flushed, if desired, with inert gas to remove molecular chlorine from the system. Flushing may be accomplished by alternatively reducing the system pressure and refilling the system with inert gas.

The bath 12 is then heated by means of furnace 10 to a temperature above the boiling point of cesium, and the pressure reduced below 100 microns of mercury absolute, and preferably below 20 microns of mercury absolute. With continued heating, said temperature may rise as high as 750 degrees centigrade as the process nears completion. Molten lithium produced by electrolysis reduces ionic cesium in the bath to molten metallic cesium. Such reduced, metallic cesium boils out of the bath driving the reaction in the following equation to the right:

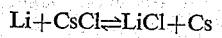
$$Li + CsCl \rightleftharpoons LiCl + Cs$$

As cesium boils out of the bath 12, it leaves the container 11 by means of outlet 18. Outlet 18 acts as a side arm condenser, condensing cesium vapor to liquid cesium. The condenser 18 may optionally be cooled, if desired, as by a water coil 19. Cesium condensed in condenser 18 runs into the receiving vessel 20 where it is collected. Cesium is removed from the system for storage or use by means of the outlet 22. Calculating the data, a starting bath composition containing 3.5 equivalents of lithium chloride and 1.5 equivalents of cesium chloride was electrolyzed at a temperature of 500 degrees centigrade and a pressure of one atmosphere. There was 0.194 equivalent of electricity consumed, with a production of 0.183 equivalent of metal, by the electrolysis process. The cathode efficiency thus indicated was 94.4 percent. Composition analysis of the metal so produced indicated the presence of 99.7 mole percent lithium and 0.3 mole percent cesium.

The lithium metal so produced reacts with cesium chloride to produce cesium metal. Efficiencies of this step can be as high as 90 percent and higher and the cesium so produced generally has a purity in excess of 99 percent.

After cesium has been removed from the bath by distillation, the procedure may be repeated by filling the system with inert gas and adding cesium chloride to the electrolysis bath until the desired bath starting composition is obtained. Valve 15 is opened and electrolysis begun to reduce lithium chloride to lithium and chlorine.

Using substantially the same process, but with carbon as the anode material, cesium is produced from a starting electrolysis bath containing cesium bromide and alkali metal bromides. When mixtures of bromides and chlorides are used as electrolysis bath components, carbon is usually selected as the anode material since bromide will be liberated first. When chlorine is liberated, graphite is usually the anode material of choice.

For clarity and ease in understanding the present invention, the appended drawing is presented and described in schematic form. In practice, the anode is generally hooded in order to facilitate removal of halogen as it is produced. Further, said anode is usually protected, by a suitable physical barrier, from the alkali metal cathode products which are generally of a sufficiently low density that they will float on the surface of the salt bath. Failure to do so will generally cause a sharp decrease in electrode efficiency due to reaction of the electrolysis products to form alkali metal halides.

By the term, alkali metal halide, as used in this application, is meant a salt or mixture of salts wherein the alkali metal constituent of said salt or mixture of salts boils at a temperature higher than the boiling point of cesium, i.e., the alkali metal is other than cesium such as lithium, potassium, or sodium; and the halide constituent of said salt or mixture of salts is fluorine, chlorine, bromine, or iodine. A preferred alkali metal is lithium, while chlorine and bromine are preferred halogens, for use as alkali metal halides in this invention. Cesium chloride, cesium bromide, cesium fluoride, and cesium iodide are cesium halides usable in the process of this invention with cesium chloride and cesium bromide being preferred. Generally, it is desirable to use the same halide of cesium and alkali metal, but this is not essential to the operability of the process so long as the halogen evolved during electrolysis is compatible with the anode material. Starting bath compositions may range from a ratio of about 2 moles alkali metal halide to 1 mole cesium halide to a ratio of about 3.5 or 4 moles alkali metal halide to 1 mole of cesium halide. A desirable bath composition contains 7 moles alkali metal halide to 3 moles cesium halide. Upon completion of the electrolysis step, the preferred bath salt composition will contain 35 mole percent alkali metal halide and 65 mole percent cesium halide, but the alkali halide may be reduced further if desired.

Electrodes should be of materials which are inert to the metals or the halogens produced by this process. For convenience, the container may be so constructed of a conducting material and electrically connected to the direct current source so as to be cathodic. If, for a given electrode, a material is chosen which is inert to the product formed at that electrode, but which will react with the product formed at the complementary electrode, care must be taken to protect the first electrode from the product of the complementary electrode.

Materials of construction for the apparatus to be employed in the process of the present invention are those materials which will withstand the temperature, the reduced pressure, and be unaffected by the starting materials and products of the reactions. If the container is to be used as a cathode, care must be taken to properly insulate said container from the anode in order that current flows through the molten salt bath.

Electrolysis should be carried on at a temperature above the melting point of the salt mixture, but generally below the boiling point of cesium. Said temperature may range from about 300 degrees centigrade to about 700 degrees centigrade, the optimum range being from about 440 degrees centigrade to about 500 degrees centigrade, and the preferred temperature being 460 degrees centigrade.

Reduction of cesium by alkali metal and simultaneous distillation of cesium from the salt-metal bath mixture is carried out at a temperature above the boiling point of cesium, but below the boiling point of the reducing alkali metal.

Atmospheric pressure is generally used throughout the electrolysis step, although reduced pressure may be used if desired. Pressure during electrolysis should not be reduced sufficiently during this step that cesium formed will boil out of the bath. Pressure higher than atmospheric would retard the electrolysis step and would thus be of little advantage. Distillation is carried out at greatly reduced pressures. Pressure within the system during distillation is reduced to below 100 microns of mercury absolute, and preferably to below 20 microns of mercury absolute.

Cesium produced by the method of the present invention is generally of a high purity. Because of excellent cathode efficiency and other features of the present invention, the process is relatively inexpensive when compared with known means for the production of cesium.

Various modifications may be made in the present invention without departing from the spirit or scope thereof, and it is to be understood that we limit ourselves only as defined in the appended claims.

We claim:

1. A method of producing cesium from a cesium halide which comprises: heating a bath of cesium halide and an alkali metal halide wherein the alkali metal is other than cesium in a closed container to a temperature at which said bath is molten and maintaining said bath in a molten state at a temperature below the boiling point of cesium; positioning within said bath a pair of electrodes; electrically connecting said electrodes to a direct current source and passing current through said bath between said electrodes, thereby producing gaseous halogen and alkali metal; removing said gaseous halogen, as produced, from contact with said bath; disconnecting said direct current source; evacuating the container while heating the metal-salt bath mixture to a temperature above the boiling point of cesium, thereby distilling cesium from said bath mixture as it is reduced by said alkali metal produced from said electrolysis; and collecting said cesium.

2. A method of producing cesium from a cesium halide which comprises: heating a bath of cesium halide and an alkali metal halide wherein the alkali metal is other than cesium in a closed container to a temperature at which said bath is molten and maintaining said bath in a molten state at a temperature below the boiling point of cesium; positioning within said bath a pair of electrodes; electrically connecting said electrodes to a direct current source and passing current through said bath between said electrodes, thereby producing gaseous halogen and alkali metal; removing said gaseous halogen, as produced, from contact with said bath; disconnecting said direct current source; evacuating the container while heating the metal-salt bath mixture to a temperature above the boiling point of cesium and below the boiling point of the alkali metal, thereby distilling cesium from said bath mixture as it is reduced by said alkali metal produced from said electrolysis; and collecting said cesium.

3. A method of producing cesium from a cesium halide which comprises: heating a bath of cesium halide and lithium halide in a closed container to a temperature at which said bath is molten and maintaining said bath in a molten state at a temperature below the boiling point of cesium; positioning within said bath a pair of electrodes; electrically connecting said electrodes to a direct current source and passing current through said bath between said electrodes, thereby producing gaseous halogen and lithium metal; removing said gaseous halogen, as produced, from contact with said bath; disconnecting said direct current source; evacuating the container while heating the metal-salt bath mixture to a temperature above the boiling point of cesium, thereby distilling cesium from said bath mixture as it is reduced by said lithium metal produced from said electrolysis; and collecting said cesium.

4. A method of producing cesium from a cesium halide which comprises: heating a bath of a cesium halide selected from the group consisting of cesium chloride and cesium bromide and an alkali metal halide wherein the alkali metal is other than cesium in a closed container to a temperature at which said bath is molten and maintaining said bath in a molten state at a temperature below the boiling point of cesium; positioning within said bath a pair of electrodes; electrically connecting said electrodes to a direct current source and passing current through said bath between said electrodes, thereby producing gaseous halogen and alkali metal; removing said gaseous halogen, as produced, from contact with said bath; disconnecting said direct current source; evacuating the container while heating the metal-salt bath mixture to a temperature above the boiling point of cesium, thereby distilling cesium from said bath mixture as it is reduced by said alkali metal produced from said electrolysis; and collecting said cesium.

5. A method of producing cesium from a cesium halide which comprises: heating a bath of a cesium halide selected from the group consisting of cesium chloride and cesium bromide and an alkali metal halide selected from the group consisting of lithium chloride, lithium bromide, potassium chloride, potassium bromide, sodium chloride, and sodium bromide in a closed container to a temperature at which said bath is molten and maintaining said bath in a molten state at a temperature below the boiling point of cesium; positioning within said bath a pair of electrodes; electrically connecting said electrodes to a direct current source and passing current through said bath between said electrodes, thereby producing gaseous halogen and alkali metal; removing said gaseous halogen, as produced, from contact with said bath; disconnecting said direct current source; evacuating the container while heating the metal-salt bath mixture to a temperature above the boiling point of cesium, thereby distilling cesium from said bath mixture as it is reduced by said alkali metal produced from said electrolysis; and collecting said cesium.

6. A method of producing cesium from a cesium halide which comprises: heating a bath of cesium chloride and an alkali metal halide selected from the group consisting of lithium chloride, lithium bromide, potassium chloride, potassium bromide, sodium chloride, and sodium bromide in a closed container to a temperature at which said bath is molten and maintaining said bath in a molten state at a temperature below the boiling point of cesium; positioning within said bath a pair of electrodes; electrically connecting said electrodes to a direct current source and passing current through said bath between said electrodes, thereby producing gaseous halogen and alkali metal; removing said gaseous halogen, as produced, from contact with said bath; disconnecting said direct current source; evacuating the container while heating the metal-salt bath mixture to a temperature above the boiling point of cesium, thereby distilling cesium from said bath mixture as it is reduced by said alkali metal produced from said electrolysis; and collecting said cesium.

7. A method of producing cesium from a cesium halide which comprises: heating a bath of cesium chloride and lithium chloride in a closed container to a temperature at which said bath is molten and maintaining said bath in a molten state at a temperature below the boiling point of cesium; positioning within said bath a pair of electrodes; electrically connecting said electrodes to a direct current source and passing current through said bath between said electrodes, thereby producing gaseous chlorine and lithium metal; removing said gaseous chlorine, as produced, from contact with said bath; disconnecting said direct current source; evacuating the container while heating the metal-salt bath mixture to a temperature above the boiling point of cesium, thereby distilling cesium from said bath mixture as it is reduced by said lithium metal produced from said electrolysis; and collecting said cesium.

8. A method of producing cesium from a cesium halide which comprises: heating a bath of cesium bromide and lithium bromide in a closed container to a temperature at which said bath is molten and maintaining said bath in a molten state at a temperature below the boiling point of cesium; positioning within said bath a pair of electrodes; electrically connecting said electrodes to a direct current source and passing current through said bath between said electrodes, thereby producing gaseous bromine and lithium metal; removing said gaseous bromine, as produced, from contact with said bath; disconnecting said direct current source; evacuating the container while heating the metal-salt bath mixture to a temperature above the boiling point of cesium, thereby distilling cesium from said bath mixture as it is reduced by said lithium metal produced from said electrolysis; and collecting said cesium.

9. A method of producing cesium from a cesium halide which comprises: heating a bath of cesium halide and an alkali metal halide wherein the alkali metal is other than cesium in a closed container to a temperature above 400 degrees centigrade and maintaining said bath in a molten state at a temperature below 670 degrees centigrade; positioning within said bath a pair of electrodes; electrically connecting said electrodes to a direct current source and passing current through said bath between said electrodes, thereby producing gaseous halogen and alkali metal; removing said gaseous halogen, as produced, from contact with said bath; disconnecting said electrodes, evacuating the container while heating the metal-salt bath mixture to a temperature above 670 degrees centigrade, thereby distilling cesium from said bath mixture as it is reduced by said alkali metal produced from said electrolysis; and collecting said cesium.

10. A method of producing cesium from a cesium halide which comprises: heating a bath of 30 mole percent cesium chloride and 70 mole percent lithium chloride in a closed container to 500 degrees centigrade at which temperature said bath is molten and maintaining said bath in a molten state at 500 degrees centigrade; positioning within said bath a pair of electrodes; electrically connecting said electrodes to a direct current source and passing current through said bath between said electrodes, thereby producing gaseous chlorine and lithium metal; removing said gaseous chlorine, as produced, from contact with said bath; disconnecting said direct current source; evacuating the container to a pressure below 100 microns of mercury absolute while heating the metal-salt bath mixture to a temperature above 670 degrees centigrade, thereby distilling cesium from said bath mixture as it is reduced by said lithium metal produced from said electrolysis; and collecting said cesium.

11. A method of producing cesium from a cesium halide which comprises: heating a bath of 30 mole percent cesium bromide and 70 mole percent lithium bromide in a closed container to 500 degrees centigrade at which temperature said bath is molten and maintaining said bath in a molten state at 500 degrees centigrade; positioning within said bath a pair of electrodes; electrically connecting said electrodes to a direct current source and passing current through said bath between said electrodes, thereby producing gaseous bromine and lithium metal; removing said gaseous bromine, as produced, from contact with said bath; disconnecting said direct current source; evacuating the container to a pressure below 100 microns of mercury absolute while heating the metal-salt bath mixture to a temperature above 670 degrees centigrade, thereby distilling cesium from said bath mixture as it is reduced by said lithium metal produced from said electrolysis; and collecting said cesium.

12. A method of producing cesium from a cesium halide which comprises: heating a bath of cesium halide and an alkali metal halide wherein the alkali metal is other than cesium in a closed container to a temperature at which said bath is molten and maintaining said bath in a molten state at a temperature below the boiling point of cesium; positioning within said bath an electrode; electrically connecting said electrode to said container through a direct current source in such a manner that said container is cathodic and passing current through said bath, thereby producing gaseous halogen at the anode and alkali metal at the cathode; removing said gaseous halogen, as produced, from contact with said bath; disconnecting said direct current source; evacuating the container while heating the metal-salt bath mixture to a temperature above the boiling point of cesium, thereby distilling cesium from said bath mixture as it is reduced by said alkali metal produced from said electrolysis; and collecting said cesium.

References Cited by the Examiner

UNITED STATES PATENTS

| | | | |
|---|---|---|---|
| 2,852,363 | 9/58 | Adams et al. | 75—66 |
| 2,862,863 | 12/58 | Griffith | 204—68 |
| 2,944,950 | 7/60 | Hayes | 204—245 |
| 2,987,462 | 6/61 | Chauvin et al. | 204—245 |
| 3,007,792 | 11/61 | Ortlieb et al. | 75—66 |
| 3,037,927 | 6/62 | Gallinger | 204—245 |

FOREIGN PATENTS 590,274  7/47  Great Britain.

OTHER REFERENCES

Elektrolyse Geschomolzener Salze, Lorenz, Teil I–III, 1905, page 41.

BENJAMIN HENKIN, *Primary Examiner.*
JOHN R. SPECK, *Examiner.*